US011250971B2

(12) United States Patent
Colaianna et al.

(10) Patent No.: US 11,250,971 B2
(45) Date of Patent: Feb. 15, 2022

(54) DOWNHOLE CABLE

(71) Applicant: SOLVAY SPECIALTY POLYMERS ITALY S.P.A., Bollate (IT)

(72) Inventors: Pasqua Colaianna, Milan (IT); Marco Mirenda, Rho (IT); Giambattista Besana, Mariano Comense (IT); Giulio Brinati, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 914 days.

(21) Appl. No.: 14/388,228

(22) PCT Filed: Mar. 25, 2013

(86) PCT No.: PCT/EP2013/056235
§ 371 (c)(1),
(2) Date: Sep. 25, 2014

(87) PCT Pub. No.: WO2013/144073
PCT Pub. Date: Oct. 3, 2013

(65) Prior Publication Data

US 2015/0060104 A1 Mar. 5, 2015

(30) Foreign Application Priority Data

Mar. 26, 2012 (EP) .................................... 12161230

(51) Int. Cl.

| | |
|---|---|
| ***B32B 1/08*** | (2006.01) |
| ***H01B 7/29*** | (2006.01) |
| ***H01B 1/02*** | (2006.01) |
| ***H01B 3/44*** | (2006.01) |
| ***H01B 9/00*** | (2006.01) |

(52) U.S. Cl.
CPC ............... *H01B 7/292* (2013.01); *H01B 1/02* (2013.01); *H01B 3/445* (2013.01); *H01B 9/005* (2013.01)

(58) Field of Classification Search
CPC ................................ H01B 3/445; C08F 16/24
See application file for complete search history.

(56) References Cited

U.S. PATENT DOCUMENTS

| | | | |
|---|---|---|---|
| 3,271,341 A | 9/1966 | Garrison, Jr. | |
| 4,864,006 A | 9/1989 | Giannetti et al. | |
| 2003/0069343 A1 | 4/2003 | Smith et al. | |
| 2009/0192259 A1 | 7/2009 | Colaianna et al. | |
| 2010/0147505 A1* | 6/2010 | Manke | F04B 47/06 166/66.4 |
| 2012/0031607 A1 | 2/2012 | Lahijani | |
| 2013/0153260 A1* | 6/2013 | Favereau | H01B 7/18 174/102 C |

FOREIGN PATENT DOCUMENTS

| | | | |
|---|---|---|---|
| EP | 184459 | A2 | 6/1986 |
| EP | 247379 | A1 | 12/1987 |
| WO | 2007011631 | A1 | 1/2007 |
| WO | 2009146277 | A1 | 12/2009 |
| WO | 2010003929 | A1 | 1/2010 |

OTHER PUBLICATIONS

ISO Standard 12086-2, 2006, first two pages (Year: 2006).*
ASTM Standard D1238-10, 2010 (Year: 2010).*
Sheirs, Modern Fluoropolymers, 1997, John Wiley and Sons, Chapter 11, pp. 223-237 (Year: 1997).*
Shenoy et a., Thermoplastic Melt Rheology and Processing, 1996, CRC Press, pp. 123-125 (Year: 1996).*
Alger Mark S.M., "Polymer Science Dictionary", 1989, London School of Polymer Technology, Polytechnic of North London, UK published by Elsevier Applied Science, p. 476.
Standard ASTM D1238, "Standard Test Method for Melt Flow Rates of Thermoplastics By Extrusion Plastometer", 2004, p. 1-13.

* cited by examiner

*Primary Examiner* — Zachary M Davis
(74) *Attorney, Agent, or Firm* — Osha Bergman Watanabe & Burton LLP

(57) ABSTRACT

The present invention pertains to a cable comprising: —at least one conductor coated by an insulation coating layer, —a first protective layer surrounding said insulation coating layer, said first protective layer at least comprising, but preferably being made of a tetrafluoroethylene (TFE) copolymer comprising from 0.8% to 2.5% by weight of recurring units derived from at least one perfluorinated alkyl vinyl ether having formula (I) here below: $CF_2{=}CF{-}O{-}R_f$, wherein $R_f$ is a linear or branched $C_3$-$C_5$ perfluorinated alkyl group or a linear or branched $C_3$-$C_{12}$ perfluorinated alkyl group comprising one or more ether oxygen atoms, said TFE copolymer having a melt flow index comprised between 1.0 and 6.0 g/10 min, as measured according to ASTM D1238 at 372° C. under a load of 5 Kg [polymer (F)]; —optionally, a second protective layer surrounding said first protective layer, and —an armor shell surrounding said first or second protective layer. The invention also pertains to use of the cable in downhole wells.

14 Claims, No Drawings

DOWNHOLE CABLE

This application is a U.S. national stage entry under 35 U.S.C. § 371 of International Application No. PCT/EP2013/056235 filed Mar. 25, 2013, which claims priority to European application No. 12161230.3 filed on Mar. 26, 2012. The entire contents of these applications are explicitly incorporated herein by this reference.

TECHNICAL FIELD

The present invention relates to a cable comprising a fluoropolymer protective layer and to use of said cable in downhole wells.

BACKGROUND ART

Many types of cables have been used over the years in downhole wells for communication with logging tools and other equipments located in a downhole environment.

More particularly, cables are used in the oil drilling industry to transmit information and data from a drilling equipment to a control unit located remote to the onshore or offshore drilling region.

Cables are also used for electrically power downhole operations such as drilling.

Downhole wells are bored in the earth and are typically used for conveying oils and/or gases from the earth or for recovering heat energy at temperatures depending where the well is drilled and how deep, typically higher than 200° C. The drilling operations indeed involve deeper and deeper wells and typically reach temperatures as high as 260° C. or higher than 260° C., especially proximate to the bottom of the well.

The most common of these cables are typically referred to as wireline cables by virtue of their inclusion of one or multiple layers of wire armors which also serve as the load bearing members of the cable. While wireline cables are typically durable, at least in many environments, they are not always well-suited for certain applications.

A protective layer typically surrounds the central core of the cable. The central core of the cable may be an electrical conductor or an optical fiber. The protective layer may be formed of any materials suitable for use in downhole conditions. In applications where the central core includes an electrical conductor, the protective layer will commonly also be electrically insulative.

Where an insulative protective layer is required and high operating temperatures, usually higher than 200° C., are encountered, melt-processable tetrafluoroethylene (TFE) fluoropolymers with 1-5% by moles of recurring units derived from perfluoroalkylvinylethers (PAVEs) are currently preferred. In particular, melt-processable TFE copolymers with perfluoropropylvinylether (PPVE) are most preferred because of their higher melting point, typically between 302° C. and 310° C.

For instance, US 2012/0031607 (E.I. DU PONT DE NEMOURS AND COMPANY) 9 Feb. 2012 discloses communication cables for use in downhole wells for operations at temperatures of at least 280° C., wherein the insulative protective layer comprises commonly known melt-processable TFE copolymers with PAVEs blended with low molecular weight polytetrafluoroethylene (PTFE).

However, commonly known melt-processable fluoropolymers derived from tetrafluoroethylene (TFE) and perfluoroalkylvinylethers (PAVEs) typically suffer from plastic deformation under the influence of external pressure impacts, in particular at high operating temperatures, thus causing the fluoropolymers to squeeze out within the gaps in the adjacent wire armors of the cable.

This commonly results in a failure of the cable or a deformation of the cable that renders it inefficient.

SUMMARY OF INVENTION

It has been now found that the cable of the present invention successfully enables overcoming the deficiencies of currently known cable configurations suitable for use in downhole wells.

It is thus an object of the present invention a cable comprising:

- at least one conductor coated by an insulation coating layer,
- a first protective layer surrounding said insulation coating layer, said first protective layer at least comprising, but preferably being made of, a tetrafluoroethylene (TFE) copolymer comprising from 0.8% to 2.5% by weight of recurring units derived from at least one perfluorinated alkyl vinyl ether having formula (I) here below:

$$CF_2{=}CF{-}O{-}R_f,$$

- wherein $R_f$ is a linear or branched $C_3$-$C_5$ perfluorinated alkyl group or a linear or branched $C_3$-$C_{12}$ perfluorinated alkyl group comprising one or more ether oxygen atoms,
- said TFE copolymer having a melt flow index comprised between 1.0 and 6.0 g/10 min, as measured according to ASTM D1238 at 372° C. under a load of 5 Kg [polymer (F)];
- optionally, a second protective layer surrounding said first protective layer, and
- an armor shell surrounding said first or second protective layer.

The Applicant has surprisingly found that the polymer (F) according to the present invention is successfully endowed with improved mechanical properties with respect to commercially available TFE copolymers with PAVEs, in particular higher yield strength values and lower creep strain values, to advantageously provide for cables which are stable under high pressure and high temperature conditions, while retaining chemical resistance in harsh environments and thermal shock resistance at high temperatures.

The yield strength of the polymer (F) is a measure of the maximum stress to be applied at which the polymer (F) begins to deform plastically. The stress at which yield occurs is dependent on both the rate of deformation (strain rate) and, more significantly, on the temperature at which the deformation occurs.

The creep strain of the polymer (F) is a measure of its tendency to deform plastically under the influence of an applied stress. It occurs as a result of long term exposure to high levels of stress which are below the yield strength of the material. The rate of this deformation is a function of the material properties, exposure time, exposure temperature and the applied structural load.

For the purpose of the present invention, by the term "plastic deformation" it is hereby intended to denote permanent and non-reversible deformation of the polymer (F).

The yield strength and the creep strain of the polymer (F) are thus a measure of its tendency to deform plastically and to squeeze out of the armor shell of the cable under the influence of external pressure impacts, in particular at high operating temperatures and/or high load.

The thermal shock resistance of the cable is a measure of its ability to withstand a rapid and significant temperature change until failure occurs.

The cable may be any wire, transmission line or similar structure that may be used in drilling operations, such as onshore or offshore oil drilling.

The insulated conductor may include any material which is capable of facilitating movement of electric charges, light or any other communication medium, which may be used in any industry. The insulated conductor may include any conductor materials such as copper, copper-nickel alloys, aluminum, alloys, fiber electric hybrid materials, fiber optical materials, stranded or woven conductors or any other material known within the industry.

The insulated conductor may be capable of facilitating movement of energy capable of powering a device or facilitating a communication or control signal between devices.

The insulated conductor may include one or more insulated conductors.

The insulation coating surrounding the insulated conductor may include any type of insulating material. This may include a thermoset or thermoplastic insulation coating material, such as an acrylic, epoxy or plastic. Preferably, each insulated conductor is individually insulated with an insulation coating, whereby any communication or signal within one insulated conductor is separated from a communication or signal within another insulated conductor. However, more than one insulated conductor may be encapsulated by one insulation coating. For example, if different types of insulated conductors are used within one cable, each type of insulated conductor may require an individual insulation coating layer, whereas insulated conductors of a common type may be insulated by a single insulated conductor. When more than one insulated conductor is used, the insulation coating layers are preferably distinct from one another, wherein each insulated conductor is individually identifiable.

The cable of the invention preferably further comprises a second protective layer.

The second protective layer may be a layer formed of, or at least comprising, a thermoset or thermopolymer material.

Non-limitative examples of suitable second protective layers include, notably, semi-crystalline fluoropolymers such as ethylene-chlorotrifluoroethylene and ethylene-tetrafluoroethylene fluoropolymers.

The armor shell is a sheath or exterior coating or layer that is positioned exterior to the insulated coating and surrounds the insulated conductor. This configuration allows the armor shell to protect the inner components of the cable, including the insulated conductors and the insulation coating layer adhered thereto. Any material, substance or layer located on the exterior of the cable and capable of protecting the cable may be considered an armor shell. The armor shell may be constructed from a strong material, such as a stainless steel, a nickel-based alloy, or a corrosion resistant alloy, which protects the cable from foreign objects penetrating the cable, such as debris from a drilling process. The armor shell may also include any woven, solid, particulate-based and layered protecting materials.

The armor shell may be substantially concentric to the insulated conductor portion, or it may be off-centered from an imaginary axis of the cable. For example, in some uses, it may be desirable to have the insulated conductor be positioned at the center of the armor shell, whereas other uses may requires the insulated conductor to be positioned directly abutting an interior surface of the armor shell.

A cable may also include variations in where the insulated conductor is positioned. For example, the armor shell may be positioned substantially concentric to the insulated conductor at one place along the length of the cable, and in an off-centered position at another place on the cable.

It has been found that the use of the first protective layer creates a cable with a high structural integrity, whereby the interior components of the cable, including the insulated conductors, may be retained within the armor shell, especially when the cable is positioned in a substantially vertical orientation. This prevents movement of the components of the cable within the armor shell, thereby allowing it to be used in high-stress conditions, such as those experiences in downhole drilling operations.

This construction allows for a cable that can be used for both horizontal and vertical purposes without compromising the integrity or utility of the cable and without the need for a compressive force on the insulated conductors. This construction also allows the cable to be used in a variety of temperatures, including all temperatures, such as temperatures up to 280° C., preferably up to 300° C.

According to a first embodiment of the invention, the cable is positioned substantially vertical within a hole. This orientation of the cable may be needed in operations where the cable is at least partially placed within a drilled or bored hole within the earth or a body of water, such as an ocean. The armor shell of the cable may be positioned proximate to the ground, which may include materials such as rock, dirt, soil, water, or a combination thereof. The armor shell may prevent articles within the ground from penetrating the cable and causing damage to a component within the cable. For example, the armor shell may prevent rocks or other objects from damaging the cable while it is placed within the hole.

Additionally, the armor shell may be used to secure the cable in a specific position via an attachment to one or more anchoring structures. The anchoring structures may be placed at an upper end of the cable or along any part of the cable, including the bottom or a mid-section.

Furthermore, the armor shell may also support the cable between two anchoring structures or in any position within a hole. This arrangement enables tensile or compressive forces, many of which may be generated from the weight of the cable to be transferred to the armor shell instead of the insulated conductor. An identification marking may be included on the insulation coating layer adhered to the insulated conductor. The identification marking may include any type of marking commonly used on cables, including specific line configurations, colors, written text or textural elements.

In operation, the cable may be placed with one end of the cable in a position that is substantially above the other end of the cable.

According to a second embodiment of the invention, the cable is positioned to run any horizontal length, alone or in combination with a vertical length. For example, the cable may be suspended within a hole drilled within the earth's crust, wherein one end of the cable is located above the earth's crust and the other end is located below the earth's crust. The cable may be held in this position for any period of time, and thus, the cable must be resistant to the pullout force created by gravity acting on the insulated conductor(s).

As one having ordinary skill in the art would recognize, many variations, configurations and designs may be included with the cable, or any component thereof, all of which are considered within the scope of the disclosure.

The resulting cable structure, preferably with concentric layers that define generally cylindrical layers (layers that are as cylindrical as reasonably possible in view of the materials and structures used and reasonable manufacturing constraints), will be relatively resistant to deformation from the cylindrical shape under pressure, and thus form a cable particularly well-suited for use in high pressure environments. For example, in cables in accordance with this embodiment, particularly suited for use in such high pressure applications, the maintaining of the cylindrical core will be one significant feature to ensure that the further layers surrounding that core, and particularly the outer sheath, will retain their generally cylindrical confirmations as much as is possible, even under extensive use and exposure to high pressures, potentially exceeding 30000 psi.

Further, additional layers, such as additional protective layers or additional conductive structures may be provided.

In some cases, it may be desirable to use additional layers such as tape layers notably including PTFE tape. In some cases such tape layers may ease construction of the cable; while in other embodiments, a PTFE tape layer may facilitate relative motion between layers, such as will facilitate repeated flexing of the cable without detrimental strain being induced within the cable.

The polymer (F) of the first protective layer of the cable of the invention is typically manufactured by aqueous emulsion polymerisation or aqueous suspension polymerisation processes.

The polymer (F) is preferably manufactured by aqueous emulsion polymerisation.

The aqueous emulsion polymerisation is typically carried out in an aqueous medium in the presence of an inorganic water-soluble radical initiator, such as peroxide, percarbonate, persulphate or azo compounds. A reducing agent can be added so as to make easier the initiator decomposition. Non-limitative examples of suitable reducing agents include iron salts. The initiator amount used depends on the reaction temperature and on the reaction conditions. The polymerisation process is carried out at temperatures typically comprised between 50° C. and 90° C., preferably between 70° C. and 80° C. A chain transfer agent may also be introduced during the polymerisation reaction. Non-limitative examples of suitable chain transfer agents include ethane, methane, propane, chloroform and the like. The polymerisation may be carried out in the presence of fluorinated surfactants such as for example perfluoroalkylcarboxylic acid salts (for example ammonium perfluorocaprylate, ammonium perfluorooctanoate) or other compounds such as for example perfluoroalkoxybenzensulphonic acid salts, as described for example in EP 184459 A (E.I. DU PONT DE NEMOURS AND COMPANY) 11 Jun. 1986. Some other fluorinated surfactants that can be used in the polymerization process are described in U.S. Pat. No. 3,271,341 (E.I. DU PONT DE NEMOURS AND COMPANY) 6 Sep. 1966, WO 2007/011631 (3M INNOVATIVE PROPERTIES COMPANY) 25 Jan. 2007 and WO 2010/003929 (SOLVAY SOLEXIS S.P.A.) 14 Jan. 2010. It is particularly advantageous to carry out the polymerization in aqueous phase in the presence of perfluoropolyethers, which can be added in the reaction medium under the form of aqueous emulsion in the presence of a suitable dispersing agent, as described in EP 247379 A (AUSIMONT S.P.A.) 2 Dec. 1987 or, preferably, in the form of aqueous microemulsion as described in U.S. Pat. No. 4,864,006 (AUSIMONT S.P.A.) 5 Sep. 1989.

The latex so obtained is then coagulated and the solid recovered is dried and granulated. The granules are extruded by conventional melt-processing techniques.

The polymer (F) of the first protective layer of the cable of the invention is advantageously melt-processable.

By the term "melt-processable", it is hereby intended to denote a polymer (F) which can be processed by conventional melt-processing techniques.

The melt flow index measures the amount of polymer which can be pushed through a die, according to ASTM D1238 standard test method, at a specified temperature using a specified load weight. Thus, the melt flow index is a measure for the suitability for melt-processing the polymer (F). This typically requires that the melt flow index be more than 0.1 g/10 min, as measured according to ASTM D1238 at 372° C. under a load of 5 Kg.

It is essential that the polymer (F) of the first protective layer of the cable of the invention has a melt flow index comprised between 1.0 and 6.0 g/10 min, as measured according to ASTM D1238 at 372° C. under a load of 5 Kg.

It has been found that, when the melt flow index of the polymer (F) is lower than 1.0 g/10 min, as measured according to ASTM D1238 at 372° C. under a load of 5 Kg, the cable cannot be easily manufactured by melt-processing the polymer (F) using well known melt-processing techniques.

On the other hand, it has been found that, when the melt flow index of the polymer (F) is higher than 6.0 g/10 min, as measured according to ASTM D1238 at 372° C. under a load of 5 Kg, the cables obtained therefrom do not comply with the required performances under high temperature and high pressure conditions.

The polymer (F) of the first protective layer of the cable of the invention preferably has a melt flow index comprised between 1.5 and 5.5 g/10 min, more preferably between 2.0 and 5.0 g/10 min, as measured according to ASTM D1238 at 372° C. under a load of 5 Kg.

The perfluorinated alkyl vinyl ether of formula (I) of the polymer (F) preferably complies with formula (II) here below:

$$CF_2{=}CF{-}O{-}R'_f \qquad \text{(II)}$$

wherein $R'_f$ is a linear or branched $C_3$-$C_5$ perfluorinated alkyl group.

Non-limitative examples of suitable perfluorinated alkyl vinyl ethers of formula (II) include, notably, those wherein $R'_f$ is a $-C_3F_5$, $-C_4F_7$ or $-C_5F_9$ group.

The perfluorinated alkyl vinyl ether of formula (I) of the polymer (F) more preferably is perfluoropropyl vinyl ether (PPVE).

It is essential that the polymer (F) of the first protective layer of the cable of the invention comprises from 0.8% to 2.5% by weight of recurring units derived from at least one perfluorinated alkyl vinyl ether having formula (I) as defined above.

It has been found that, when the amount of recurring units derived from at least one perfluorinated alkyl vinyl ether having formula (I) is lower than 0.8% by weight, the cables obtained therefrom do not comply with the required performances under high temperature and high pressure conditions.

On the other hand, it has been found that, when the amount of recurring units derived from at least one perfluorinated alkyl vinyl ether having formula (I) is higher than 2.5% by weight, the polymer (F) suffer from plastic deformation under the influence of external pressure impacts, in particular at high operating temperatures.

The polymer (F) of the first protective layer of the cable of the invention preferably comprises from 0.9% to 2.4% by weight, more preferably from 1.0% to 2.2% by weight, even more preferably from 1.3% to 1.9% by weight of recurring units derived from at least one perfluorinated alkyl vinyl ether having formula (I) as defined above.

The polymer (F) of the first protective layer of the cable of the invention preferably comprises from 0.9% to 2.4% by weight, more preferably from 1.0% to 2.2% by weight, even more preferably from 1.3% to 1.9% by weight of recurring units derived from at least one perfluorinated alkyl vinyl ether having formula (I) as defined above, and preferably has a melt flow index comprised between 1.5 and 5.5 g/10 min, more preferably between 2.0 and 5.0 g/10 min, as measured according to ASTM D1238 at 372° C. under a load of 5 Kg.

The polymer (F) of the first protective layer of the cable of the invention preferably comprises from 0.9% to 2.4% by weight, more preferably from 1.0% to 2.2% by weight, even more preferably from 1.3% to 1.9% by weight of recurring units derived from at least one perfluorinated alkyl vinyl ether having formula (II) as defined above, and preferably has a melt flow index comprised between 1.5 and 5.5 g/10 min, more preferably between 2.0 and 5.0 g/10 min, as measured according to ASTM D1238 at 372° C. under a load of 5 Kg.

Good results have been obtained using a polymer (F) comprising from 0.9% to 2.4% by weight, preferably from 1.0% to 2.2% by weight, even more preferably from 1.3% to 1.9% by weight of recurring units derived from perfluoropropyl vinyl ether (PPVE), and having a melt flow index comprised between 1.5 and 5.5 g/10 min, more preferably between 2.0 and 5.0 g/10 min, as measured according to ASTM D1238 at 372° C. under a load of 5 Kg.

The polymer (F) of the first protective layer of the cable of the invention may further comprise recurring units derived from one or more fluorinated comonomers (F) different from the perfluorinated alkyl vinyl ether having formula (I) as defined above.

By the term "fluorinated comonomer (F)", it is hereby intended to denote an ethylenically unsaturated comonomer comprising at least one fluorine atoms.

Non-limitative examples of suitable fluorinated comonomers (F) include, notably, the followings:

(a) $C_2$-$C_8$ fluoro- and/or perfluoroolefins such as tetrafluoroethylene (TFE), hexafluoropropylene (HFP), pentafluoropropylene and hexafluoroisobutylene;

(b) $C_2$-$C_8$ hydrogenated monofluoroolefins, such as vinylidene fluoride (VDF), vinyl fluoride; 1,2-difluoroethylene and trifluoroethylene;

(c) perfluoroalkylethylenes of formula $CH_2{=}CH{-}R_{f0}$, wherein $R_{f0}$ is a $C_1$-$C_6$ perfluoroalkyl group;

(d) chloro- and/or bromo- and/or iodo-$C_2$-$C_6$ fluoroolefins such as chlorotrifluoroethylene (CTFE);

(e) (per)fluoroalkylvinylethers of formula $CF_2{=}CFOR_{f1}$, wherein $R_{f1}$ is a $C_1$-$C_2$ fluoro- or perfluoroalkyl group, e.g. $-CF_3$, $-C_2F_5$;

(f) (per)fluoro-oxyalkylvinylethers of formula $CF_2{=}CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(g) fluoroalkyl-methoxy-vinylethers of formula $CF_2{=}CFOCF_2OR_{f2}$, wherein $R_{f2}$ is a $C_1$-$C_6$ fluoro- or perfluoroalkyl group, e.g. $-CF_3$, $-C_2F_5$, $-C_3F_7$ or a $C_1$-$C_6$ (per)fluorooxyalkyl group having one or more ether groups, e.g. $C_2F_5{-}O{-}CF_3$;

(h) fluorodioxoles of formula:

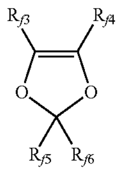

wherein each of $R_{f3}$, $R_{f4}$, $R_{f5}$ and $R_{f6}$, equal to or different from each other, is independently a fluorine atom, a $C_1$-$C_6$ fluoro- or per(halo)fluoroalkyl group, optionally comprising one or more oxygen atoms, e.g. $-CF_3$, $-C_2F_5$, $-C_3F_7$, $-OCF_3$, $-OCF_2CF_2OCF_3$.

Should one or more fluorinated comonomers (F) be present, the polymer (F) of the invention comprises typically from 0.8% to 2.5% by weight of recurring units derived from said fluorinated comonomer (F).

Nevertheless, embodiments wherein the polymer (F) is free from recurring units derived from said additional comonomer (F) are preferred.

In said preferred embodiments, the polymer (F) of the first protective layer of the cable of the invention consists essentially of:

- from 0.8% to 2.5% by weight of recurring units derived from at least one perfluorinated alkyl vinyl ether having formula (I) as defined above, and
- from 97.5% to 99.2% by weight of recurring units derived from TFE.

Chain ends, defects or other minor impurity components might be comprised in polymer (F) without this substantially affecting behaviour of the same.

The polymer (F) of the first protective layer of the cable of the invention more preferably consists essentially of:

- from 0.9% to 2.4% by weight, preferably from 1.0% to 2.2% by weight, even more preferably from 1.3% to 1.9% by weight of recurring units derived from at least one perfluorinated alkyl vinyl ether having formula (I) as defined above, and
- from 97.6% to 99.1% by weight, preferably from 97.8% to 99.0% by weight, even more preferably from 98.1% to 98.7% by weight of recurring units derived from TFE.

Excellent results have thus been obtained using a polymer (F) consisting essentially of:

- from 0.9% to 2.4% by weight, preferably from 1.0% to 2.2% by weight, even more preferably from 1.3% to 1.9% by weight of recurring units derived from perfluoropropyl vinyl ether (PPVE), and
- from 97.6% to 99.1% by weight, preferably from 97.8% to 99.0% by weight, even more preferably from 98.1% to 98.7% by weight of recurring units derived from TFE; and
- having a melt flow index comprised between 1.5 and 5.5 g/10 min, more preferably between 2.0 and 5.0 g/10 min, as measured according to ASTM D1238 at 372° C. under a load of 5 Kg.

The polymer (F) of the first protective layer of the cable of the invention is advantageously thermoplastic.

By the term "thermoplastic", it is hereby intended to denote a polymer (F) existing, at room temperature (25° C.), below its melting point if it is semi-crystalline or below its $T_g$ if it is amorphous. These polymers have the property of becoming soft when they are heated and of becoming rigid again when hey are cooled, without there being an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

The polymer (F) of the first protective layer of the cable of the invention is preferably semi-crystalline.

By the term "semi-crystalline", it is hereby intended to denote a polymer having a heat of fusion of more than 1 J/g when measured by Differential Scanning calorimetry (DSC) at a heating rate of 10° C./min, according to ASTM D 3418.

The polymer (F) of the first protective layer of the cable of the invention advantageously has a melting point comprised between 311° C. and 321° C., preferably between 312° C. and 318° C.

Very good results have been obtained using a polymer (F) having a melting point comprised between 313° C. and 317° C.

Preferred polymers (F) of the first protective layer of the cable of the invention comprise from 1.0% to 2.2% by weight of recurring units derived from at least one per-fluo-rinated alkyl vinyl ether having formula (II) and have:

- a melt flow index comprised between 1.5 and 5.5 g/10 min, as measured according to ASTM D1238 at 372° C. under a load of 5 Kg, and
- a melting point comprised between 312° C. and 318° C.

Still, more preferred polymers (F) of the first protective layer of the cable of the invention consists essentially of:

- from 1.0% to 2.2% by weight of recurring units derived from at least one per-fluo-rinated alkyl vinyl ether having formula (II), and
- from 97.8% to 99.0% by weight of recurring units derived from TFE; and have:
- a melt flow index comprised between 1.5 and 5.5 g/10 min, as measured according to ASTM D1238 at 372° C. under a load of 5 Kg, and
- a melting point comprised between 312° C. and 318° C.

The first protective layer of the cable of the invention is typically manufactured by melt-processing the polymer (F) as defined above with well-known melt-processing techniques such as melt extrusion.

The first protective layer of the cable of the invention is advantageously free from polytetrafluoroethylene (PTFE), either high molecular weight PTFE or low molecular weight PTFE.

By the term "high molecular weight PTFE", it is hereby intended to denote a non-melt-processable TFE homopolymer.

By the term "low molecular weight PTFE", it is hereby intended to denote a melt-processable TFE homopolymer.

As said, said first protective layer at least comprises but preferably is made of said polymer (F). While thus embodiments wherein polymer (F) is mixed with other components for providing said first protective layers are encompassed by the present invention, it is generally understood that said first protective layer is preferably made of said polymer (F), although minor ingredients like additives, pigments, lubricant, and the like, might still be comprised in said polymer (F) first protective layer, provided they do not substantially affect or modify properties of polymer (F).

The Applicant has surprisingly found that, due to the advantageous inherent mechanical properties of the polymer (F), the cable of the present invention may be successfully used in high-pressure downhole environments and successfully withstands to temperatures up to 280° C., preferably up to 300° C.

Another object of the present invention is use of the cable of the invention in downhole wells.

According to a first embodiment of the invention, the cable for use in downhole wells is a communication cable communicating a signal between the bottom of the well and the top of the well.

The communication cable may comprise a sensor such as for well logging tools and other types of equipments within wellbores.

According to a second embodiment of the invention, the cable for use in downhole wells is a power cable providing electrical power to the bottom of the well.

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the present invention.

Measurement of the Melt Flow Index (MFI)

The determination of the MFI was carried out according to the ASTM D1238 standard test method at 372° C. under a load of 5 Kg.

Measurement of the Second Melting Temperature (T(II) Melting Point)

The second melting temperature was determined according to the ASTM D4591 standard test method. The melting point observed at the second heating period was recorded and is hereby referred to as the melting point of the polymer.

Measurement of the Percentage by Weight of the Perfluorinated Alkyl Vinyl Ether (I) in the Polymer The determination of the perfluorinated alkyl vinyl ether monomer was carried out by FT-IR analysis and expressed as percent by weight. The perfluorinated alkyl vinyl ether monomer (I) content was determined under the followin-g conditions: the band optical density (OD) at 994 $cm^{-1}$ was nor-malized with the band optical density (OD) at 2365 $cm^{-1}$ by means of the following formula:

$$\text{Monomer } (I)\ [\%\text{ by weight}]=(\text{OD at }994\text{ cm}^{-1})/(\text{OD at }2365\text{ cm}^{-1})\times 0.99$$

Measurement of the Tensile Properties

Yield strength: Tensile tests were performed by an Instron 4203 machine using microtensile specimens as reported in ASTM D3307 standard test method; specimens were cut by hollow punch from compression molded sheets having a thickness of 1.5 mm and were stretched at a speed equal to 50 mm/min after 15 minutes of conditioning time at the required temperature.

Yield stress was evaluated as nominal stress at first zero slope point on the stress-strain curve.

The higher is the yield stress value, the higher is the resistance to plastic deformation of the polymer.

Creep strain: Tensile creep trials were performed according to ASTM D2990 standard test method after 1000 hours but using specimen dimensions described in ISO 527-1A; no extensometers were used, but specimen shape correction was employed in order to get good strain evaluation. All specimens were cut by hollow punch from compression molded sheets having thickness equal to 1.5 mm.

The lower is the creep strain value, the higher is the resistance to plastic deformation of the polymer.

Processing of Cables

Several trials of cables covering have been carried out on a wire and cable line by using a conductor of red copper having a diameter of 1 mm (AWG20 cable).

The die set-up was chosen in order to have a draw down ratio (DDR) of about 120. The final cable diameter is around 1.5 mm.

The temperature profile in the extruder is generally set in the various heater bands, starting from the hopper till the head, as following:

260, 340, 370, 390, 410° C.

This results in a temperature measured on the molten polymer that is in a range of about 420-450° C., depending on the residence time and the shear heating in the extruder and of course on the melt flow index (MFI) of the polymer.

The conductor was preheated at about 120° C.

Depending on the viscosity of the polymer, the trials have been run with a screw rotation speed in a range of 15-25 rpm, with a line speed of 30-60 ml/min.

After the exit from the die, the coated cable was cooled in a water bath at a distance from the die of about 10-20 cm.

The final cable was controlled on line by measuring the diameters in two orthogonal directions and by the spark tester. The surface smoothness and at the onset of sharkskin were also tested. The sharkskin was of course related to the melt flow index (MFI) of the tested material and can be influenced by the melt temperature at the exit of the die.

EXAMPLE 1

TFE/PPVE 99.1/0.9 (Weight Ratio)

In an AISI 316 steel vertical 22 litres autoclave, equipped with stirrer working at 400 rpm, after the vacuum has been made, were introduced in sequence:

13.9 litres of demineralised water;

18.0 g of perfluoropropylvinylether (PPVE);

138.0 g of a of a microemulsion prepared according to Example 1 of U.S. Pat. No. 4,864,006 (AUSIMONT S.P.A.) 5 Sep. 1989 having a pH of about 7.5. The autoclave was then heated up to reaction temperature of 60° C. and, when this temperature was reached, 0.72 bar of ethane were introduced. By a compressor a gaseous mixture of TFE/PPVE in nomi-nal molar ratio of 99.6/0.4 was added until reaching a pressure of 21 bar.

The composition of the gaseous mixture present at the autoclave head (as determined by GC analysis) was formed of the following compounds in the indicated molar percentages: 95.9% TFE, 1.3% PPVE, 2.8% ethane. Then, by a metering pump, 100 ml of a 0.035 M ammonium persulphate solu-tion were fed.

The polymerization pressure was maintained constant by feeding the above mentioned monomeric mixture; when 8.8 g of the mixture were fed, the monomer feeding was interrupted. The reactor was cooled to room temperature, the latex was dischar-ged and coagulated with $HNO_3$ (65% by weight) and the polymer was washed with $H_2O$ and dried at about 220° C.

Determination of the obtained polymer:

Composition (IR analysis): PPVE: 0.9% by weight

MFI: 5.0 g/10 min

Second melting temperature (T(II) melting point): 320° C.

EXAMPLE 2

TFE/PPVE 98.6/1.4 (Weight Ratio)

The same procedure as detailed under Example 1 was followed but:

25.0 g of PPVE were fed;

0.62 bar of ethane were fed;

a gaseous mixture of TFE/PPVE in nominal molar ratio of 99.4/0.6 was added.

The composition of the gaseous mixture present at the autoclave head (as determined by GC analysis) was formed of the following compounds in the indicated molar percentages: 94.1% TFE, 3.4% PPVE, 2.5% ethane.

Determinations on the obtained polymer:

Composition (IR analysis): PPVE: 1.4% by weight

MFI: 5.0 g/10 min

Second melting temperature (T(II) melting point): 317° C.

EXAMPLE 3

TFE/PPVE 98.2/1.8 (Weight Ratio)

The same procedure as detailed under Example 1 was followed but:

32.0 g of PPVE were fed;

0.6 bar of ethane were fed;

a gaseous mixture of TFE/PPVE in nominal molar ratio of 99.2/0.8 was added.

The composition of the gaseous mixture present at the autoclave head (as determined by GC analysis) was formed of the following compounds in the indicated molar percentages: 95.9% TFE, 2.0% PPVE, 2.1% ethane.

Determinations on the obtained polymer:

Composition (IR analysis): PPVE: 1.8% by weight

MFI: 5.0 g/10 min

Second melting temperature (T(II) melting point): 314° C.

EXAMPLE 4

TFE/PPVE 98.2/1.8 (Weight Ratio)

The same procedure as detailed under Example 1 was followed but:

32.0 g of PPVE were fed;

0.40 bar of ethane were fed;

a gaseous mixture of TFE/PPVE in nominal molar ratio of 99.2/0.8 was added.

The composition of the gaseous mixture present at the autoclave head (as determined by GC analysis) was formed of the following compounds in the indicated molar percentages: 96.6% TFE, 1.5% PPVE, 1.9% ethane.

Determinations on the obtained polymer:

Composition (IR analysis): PPVE: 1.8% by weight

MFI: 2.0 g/10 min

Second melting temperature (T(II) melting point): 314° C.

EXAMPLE 5

TFE/PPVE 98.6/1.4 (Weight Ratio)

The same procedure as detailed under Example 1 was followed but:

25.0 g of PPVE were fed;

0.50 bar of ethane were fed;

a gaseous mixture of TFE/PPVE in nominal molar ratio of 99.4/0.6 was added.

The composition of the gaseous mixture present at the autoclave head (as determined by GC analysis) was formed of the following compounds in the indicated molar percentages: 96.9% TFE, 1.55% PPVE, 1.55% ethane.

Determinations on the obtained polymer:

Composition (IR analysis): PPVE: 1.4% by weight

MFI: 3.0 g/10 min

Second melting temperature (T(II) melting point): 317° C.

EXAMPLE 6

TFE/PPVE 98.3/1.7 (Weight Ratio)

The same procedure as detailed under Example 1 was followed but:

28.0 g of PPVE were fed;

0.50 bar of ethane were fed;

a gaseous mixture of TFE/PPVE in nominal molar ratio of 99.3/0.7 was added.

The composition of the gaseous mixture present at the autoclave head (as determined by GC analysis) was formed of the following compounds in the indicated molar percentages: 96.5% TFE, 2.0% PPVE, 1.5% ethane.

Determinations on the obtained polymer:

Composition (IR analysis): PPVE: 1.7% by weight

MFI: 4.0 g/10 min

Second melting temperature (T(II) melting point): 315° C.

EXAMPLE 7

TFE/PPVE 98.6/1.4 (Weight Ratio)

The same procedure as detailed under Example 1 was followed but:

25.0 g of PPVE were fed;

0.40 bar of ethane were fed;

a gaseous mixture of TFE/PPVE in nominal molar ratio of 99.4/0.6 was added;

150 ml of a 0.035 M ammonium persulphate solution were fed.

The composition of the gaseous mixture present at the autoclave head (as determined by GC analysis) was formed of the following compounds in the indicated molar percentages: 96.2% TFE, 1.7% PPVE, 2.1% ethane.

Determinations on the obtained polymer:

Composition (IR analysis): PPVE: 1.5% by weight

MFI: 2.0 g/10 min

Second melting temperature (T(II) melting point): 316° C.

As shown in Table 1 here below, thermal shock tests were carried out at 280° C. following VDE 0472-608 standard test method after a six-hours thermal cycle on AWG 20 cables obtained according to procedure as detailed above. No crack was observed using polymers (F) of Examples 1 to 6 according to the invention.

TABLE 1

| Run | PPVE [% wt.] | MFI [g/10 min] | Tm [° C.] | Thermal shock |
|---|---|---|---|---|
| Example 1 | 0.9 | 5.0 | 320 | No crack |
| Example 2 | 1.4 | 5.0 | 317 | No crack |
| Example 3 | 1.8 | 5.0 | 314 | No crack |
| Example 4 | 1.8 | 2.0 | 314 | No crack |
| Example 5 | 1.4 | 3.0 | 317 | No crack |
| Example 6 | 1.7 | 4.0 | 315 | No crack |

As shown in Table 2 here below, reporting the results of yield strength tests at 280° C., the polymers (F) according to the invention advantageously exhibited improved yield stress values at temperatures up to 280° C. as compared with commercially available products of comparative Examples 1 and 3.

TABLE 2

| Run | PPVE [% wt.] | MFI [g/10 min] | Tm [° C.] | Yield stress [MPa] |
|---|---|---|---|---|
| Example 3 | 1.8 | 5.0 | 314 | 3.6 |
| Example 5 | 1.4 | 3.0 | 317 | 3.5 |
| C. Example 1 | 3.8 | 2.5 | 307 | 2.8 |
| C. Example 3 | 3.3 | 2.5 | 310 | 3.2 |

As shown in Table 3 here below, reporting the results of the creep strain tests, the polymers (F) according to the invention advantageously exhibit lower creep strain values as compared with commercially available products of comparative Examples 1 to 3.

TABLE 3

| Run | PPVE [% wt.] | MFI [g/10 min] | Tm [° C.] | Creep 250° C. 1.5 MPa | Creep 280° C. 1.0 MPa | Creep 300° C. 1.0 MPa |
|---|---|---|---|---|---|---|
| Example 5 | 1.4 | 3.0 | 317 | 6.4% | 11.8% | — |
| Example 2 | 1.4 | 5.0 | 317 | 6.8% | — | — |
| Example 7 | 1.5 | 2.0 | 316 | — | 9.3% | 20.0% |
| C. Example 1 | 3.8 | 2.5 | 307 | 17.0% | — | — |
| C. Example 2 | 3.8 | 13.0 | 307 | 19.0% | — | — |
| C. Example 3 | 3.3 | 2.5 | 310 | 12.0% | 17.8% | >40% |

It has been thus found that the cables of the present invention comprising a first protective layer at least comprising, but preferably being made of, the polymer (F) according to the invention advantageously withstand high-pressure downhole environments up to temperatures of 300° C. and exhibit an improved resistance to deform plastically and to squeeze out of the armor shell of the cable under the influence of external pressure impacts, thus being particularly suitable for use in drilling operations.

The invention claimed is:

1. A cable comprising:

at least one conductor coated by an insulation coating layer;

a first protective layer surrounding said insulation coating layer, said first protective layer being made of polymer (F), wherein polymer (F) is a tetrafluoroethylene (TFE) copolymer consisting essentially of:

from 1.3% to 1.8% by weight of recurring units derived from at least one per-fluorinated alkyl vinyl ether having formula (I):

$$CF_2{=}CF{-}O{-}R_f \quad (I),$$

wherein $R_f$ is a linear or branched C3-C5 perfluorinated alkyl group or a linear or branched C3-C12 perfluorinated alkyl group comprising one or more ether oxygen atoms, and, from 98.1% to 98.7% by weight of recurring units derived from TFE, said polymer (F) having a melt flow index comprised between 1.0 and 6.0 g/10 min, as measured according to ASTM D1238 at 372° C. under a load of 5 Kg and a melting point comprised between 312° C. and 318° C.;

optionally, a second protective layer surrounding said first protective layer, and an armor shell surrounding said first or second protective layer;

wherein the first protective layer is free from high molecular weight polytetrafluoroethylene (PTFE) or low molecular weight PTFE.

2. The cable according to claim 1, wherein polymer (F) has a melt flow index comprised between 1.5 and 5.5 g/10 min, as measured according to ASTM D1238 at 372° C. under a load of 5 Kg.

3. The cable according to claim 2, wherein polymer (F) has a melt flow index comprised between 2.0 and 5.0 g/10 min, as measured according to ASTM D1238 at 372° C. under a load of 5 Kg.

4. The cable according to claim 2, wherein the perfluorinated alkyl vinyl ether complies with formula (II):

$$CF_2{=}CF{-}O{-}R'_f \quad \text{(II)}$$

wherein $R'_f$ is a linear or branched C3-C5 perfluorinated alkyl group.

5. The cable according to claim 4, wherein the insulated conductor is selected from copper, copper-nickel alloys, aluminum, alloys, fiber electric hybrid materials, fiber optical materials, stranded or woven conductors.

6. The cable according to claim 1, wherein the perfluorinated alkyl vinyl ether complies with formula (II):

$$CF_2{=}CF{-}O{-}R'_f \quad \text{(II)}$$

wherein $R'_f$ is a linear or branched C3-C5 perfluorinated alkyl group.

7. The cable according to claim 1, wherein the perfluorinated alkyl vinyl ether is perfluoropropyl vinyl ether (PPVE).

8. The cable according to claim 1, wherein polymer (F) has a heat of fusion of greater than 1 J/g, as measured according to ASTM D3418 using Differential Scanning Calorimetry at a heating rate of 10° C/min.

9. The cable according to claim 1, wherein the insulated conductor is selected from copper, copper-nickel alloys, aluminum, alloys, fiber electric hybrid materials, fiber optical materials, stranded or woven conductors.

10. A downhole well comprising the cable according to claim 1.

11. A method for communicating a signal between the bottom of a downhole well and the top of the downhole well, the method comprising communicating a signal with a cable according to claim 1.

12. A method for providing electrical power to the bottom of a downhole well, the method comprising providing electrical power with a cable according to claim 1.

13. A cable comprising:

at least one conductor coated by an insulation coating layer;

a first protective layer surrounding said insulation coating layer, said first protective layer being made of polymer (F), wherein polymer (F) is a tetrafluoroethylene (TFE) copolymer consisting essentially of:

from 1.3% to 1.8% by weight of recurring units derived from at least one per-fluorinated alkyl vinyl ether having formula (I):

$$CF_2{=}CF{-}O{-}R_f \quad \text{(I),}$$

wherein $R_f$ is a linear or branched C3-C5 perfluorinated alkyl group or a linear or branched C3-C12 perfluorinated alkyl group comprising one or more ether oxygen atoms, and, from 98.1% to 98.7% by weight of recurring units derived from TFE, said polymer (F) having a melt flow index comprised between 1.0 and 6.0 g/10 min, as measured according to ASTM D1238 at 372° C. under a load of 5 Kg and a melting point comprised between 312° C. and 318° C.;

a second protective layer surrounding said first protective layer, wherein the second protective layer comprises a thermoset or thermopolymer material; and an armor shell surrounding said second protective layer;

wherein the first protective layer is free from high molecular weight polytetrafluoroethylene (PTFE) or low molecular weight PTFE.

14. The cable according to claim 13, wherein the second protective layer is a semi-crystalline fluoropolymer such as ethylene-chlorotrifluoroethylene and ethylene-tetrafluoroethylene.

* * * * *